S. L. Simpson,
Parallel Ruler.
No. 2,220. Reissued Apr. 3. 1866.
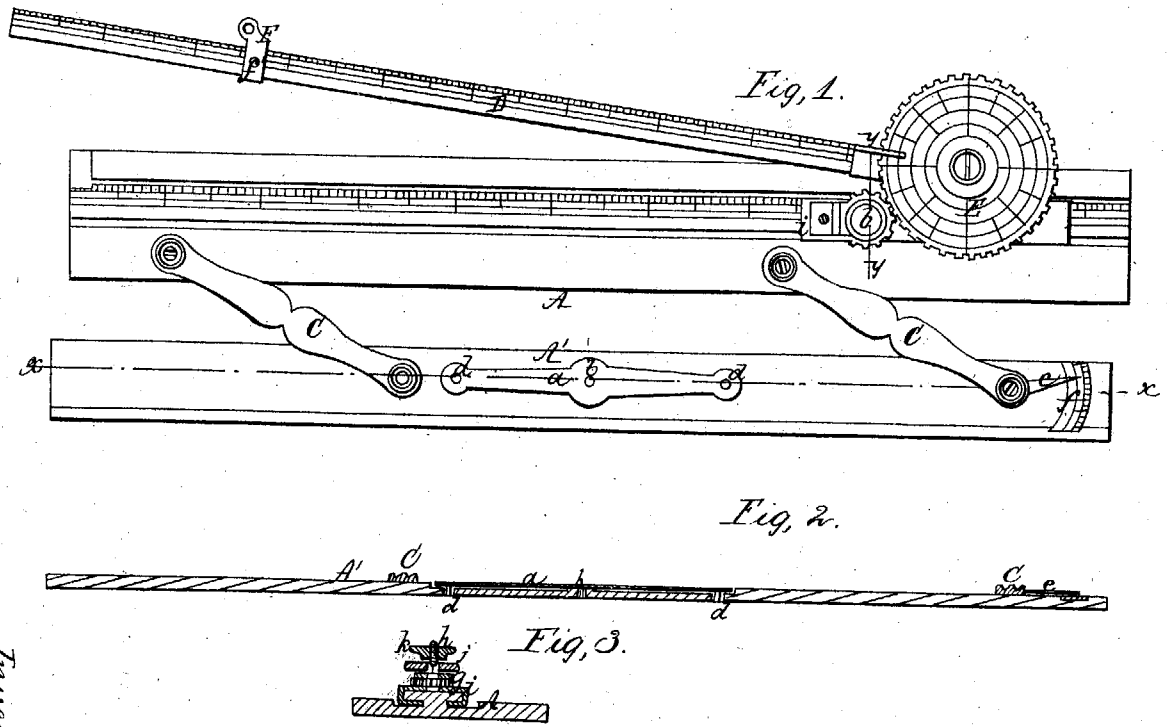
Witnesses,
J. J. B. Langton
Thos Leach
Inventor,
S. L. Simpson
Munn & Co
Per
Attorneys.
N. PETERS, PHOTO-LITHOGRAPHER, WASHINGTON, D. C.

UNITED STATES PATENT OFFICE.

S. L. SIMPSON, OF NEW YORK, N. Y.

IMPROVEMENT IN RULERS.

Specification forming part of Letters Patent No. 48,454, dated June 27, 1865; Reissue No. 2,220, dated April 3, 1866.

*To all whom it may concern:*

Be it known that I, S. L. SIMPSON, of the city, county, and State of New York, have invented a new and useful Improvement in Parallel Rulers; and I do hereby declare that the following is a full, clear, and exact description thereof, which will enable those skilled in the art to make and use the same, reference being had to the accompanying drawings, forming part of this specification, in which—

Figure 1 represents a plan or top view of this invention. Fig. 2 is a longitudinal vertical section of the same, the line *x x*, Fig. 1, indicating the plane of section. Fig. 3 is a transverse section of the same, taken in the plane indicated by the line *y y*, Fig. 1.

Similar letters of reference indicate like parts.

This invention consists in the employment or use of two or more springs-stops, applied to a strip of sheet metal, which is secured to the upper surface of the ruler, in combination with holes bored clear through the ruler in such a manner that, by pressing the fingers on the end of said strip of sheet metal the stops are depressed on the paper or other surface on which the ruler is to be used, and an accidental slipping of said ruler on the surface supporting it is prevented.

It consists, further, in an index projecting from one end of the arms which connect the two parts of the parallel ruler together, and sweeping over a scale marked on the surface of said part in such a manner that by said index the distance for which the ruler is opened can be ascertained without measuring, and the operation of the instrument is thereby materially facilitated.

It consists, also, in the arrangement of an adjustable pencil-slide on a graduated radius-arm, which extends from the center of a compass-dial attached to one end of the parallel ruler in such a manner that said pencil-slide can be readily set to any desired distance from the center of the radius-arm, and by securing a pencil in it circles of any desired diameter can be described.

It consists, finally, in the arrangement of a clamping-screw on the spindle of the pinion, which serves to impart the desired motion to the compass-dial in such a manner that by turning said clamping-screw in one direction the pinion is released and the compass-dial is free to revolve, and by turning the clamping-screw in the opposite direction the pinion is arrested and the compass-dial is retained in the position which it occupies.

A represents a parallel ruler of that class generally used by sailors for the purpose of plotting their day's work, laying out courses, and so forth, and provided with an adjustable compass-dial and radius-arm, as described in a patent granted to Henry Taylor, December 20, 1864. It must be remarked, however, that my present improvements are also applicable to parallel rulers of any desired construction.

The first part of this invention consists of a strip, *a*, of sheet brass or other suitable hard and elastic material, cut out in the form shown in Fig. 1 of the drawings, or in any other desirable form or shape. It is firmly secured to the part A′ of the parallel ruler at about the middle of its length and of the length of the ruler by a screw or pivot, *b*, being let in so that its surface is flush with that of the ruler, and its ends extend out in cavities *c*, as clearly shown in Fig. 2 of the drawings. From said ends project studs or stops *d* through holes in the ruler, and when the ruler is placed flat down on a chart or on a piece of paper or other surface, by pressing on the ends of the strip *a* the stops *d* are caused to press on the surface supporting the ruler, and accidental slipping of the same is prevented. The advantage of this improvement, particularly to parallel rulers, is so apparent that it requires no further explanation.

The two parts of my parallel ruler A are connected by two arms or links, C, in the usual manner. From the end of one of these links extends an index, *e*, and as the parallel ruler is opened this index sweeps over a scale, *f*, marked on a piece of metal which is let into the ruler or otherwise attached to the same. The scale is marked off in such a manner that it indicates by inches and parts of inches the the distance to which the parallel ruler is opened.

If it is desired, for instance, to draw a series of lines at certain fixed distances apart, this object can be effected by the aid of the index and scale in the most simple and expeditious manner. No compass, rule, or other instrument for measuring is required, and the additional cost is a mere trifle.

The radius-arm D, which has its fulcrum on the center of the compass-dial E, is graduated with a suitable scale of inches and parts of inches, and on it is fitted a pencil-slide, F, which is adjustable by a set-screw, *f'*, or other suitable means. By said set-screw the slide can be adjusted to any desired distance from the center of the compass-disk, and if a pencil is inserted in said slide circles of any desired diameter can be described.

The compass-dial E is made to rotate round its center by the action of a pinion, *g*, which is mounted on a vertical arbor, *h*. This arbor turns freely in a socket in the metal plate *i*, which protects the ruler, as shown in Fig. 3, and it is provided with a head on its inner end, which prevents it from slipping out of its socket spontaneously. A portion of said arbor is made square, and fitted into a milled disk, *j*, which serves the two pinions, and with it the compass dial. The upper end of the arbor is provided with a screw-thread, which is tapped into a nut, *k*, and by turning this nut down the disk *j* is pressed on the surface of the pinion, and the motion of said pinion and of the compass-dial is arrested. By turning the nut *k* up the pinion is released and the compass-dial is free to revolve. By this arrangement all further devices for arresting the compass-disk in the desired position are rendered superfluous, and the operation of this instrument is simplified.

What I claim as new, and desire to secure by Letters Patent, is—

1. The spring-stop *d*, applied in combination with a valve, *a*, substantially as and for the purpose set forth.

2. The index *e* and scale *f*, in combination with the link C, connecting the two parts of a parallel ruler, substantially as and for the purpose described.

3. The adjustable pencil-slide F, in combination with the radius-arm D, compass-dial E, and parallel ruler A A', constructed and operating substantially as and for the purpose set forth.

4. The clamping-screw *k*, in combination with the arbor *h*, pinion *g*, disk *j*, compass-dial E, and parallel rulers A A', constructed and operating substantially as and for the purpose described.

S. L. SIMPSON.

Witnesses:
M. M. LIVINGSTON,
WM. E. LYON.